(12) United States Patent
Wang et al.

(10) Patent No.: US 8,645,380 B2
(45) Date of Patent: Feb. 4, 2014

(54) OPTIMIZED KD-TREE FOR SCALABLE SEARCH

(75) Inventors: Jingdong Wang, Beijing (CN);
Xian-Sheng Hua, Beijing (CN);
Shipeng Li, Redmond, WA (US); You Jia, Hubei (CN)

(73) Assignee: Microsoft Corporation, Redmond, WA (US)

( * ) Notice: Subject to any disclaimer, the term of this patent is extended or adjusted under 35 U.S.C. 154(b) by 353 days.

(21) Appl. No.: 12/940,880

(22) Filed: Nov. 5, 2010

(65) Prior Publication Data

US 2012/0117122 A1    May 10, 2012

(51) Int. Cl.
*G06F 17/30* (2006.01)

(52) U.S. Cl.
USPC ......................................................... 707/737

(58) Field of Classification Search
USPC ................................ 707/2, 102, 737; 713/163
See application file for complete search history.

(56) References Cited

U.S. PATENT DOCUMENTS

| | | | |
|---|---|---|---|
| 5,544,284 A | 8/1996 | Allebach et al. | |
| 6,122,628 A | 9/2000 | Castelli et al. | |
| 6,138,113 A | 10/2000 | Dean et al. | |
| 6,154,746 A | 11/2000 | Berchtold et al. | |
| 6,321,220 B1 | 11/2001 | Dean et al. | |
| 6,549,896 B1 | 4/2003 | Candan et al. | |
| 7,117,206 B1 | 10/2006 | Bharat et al. | |
| 7,191,164 B2 | 3/2007 | Ray et al. | |
| 7,539,657 B1 * | 5/2009 | Liu et al. .......................... 706/45 | |
| 7,630,973 B2 | 12/2009 | Black et al. | |
| 7,698,294 B2 | 4/2010 | Ma et al. | |
| 7,983,341 B2 | 7/2011 | Wang | |
| 2005/0114331 A1 | 5/2005 | Wang et al. | |
| 2005/0165757 A1 | 7/2005 | Broder | |
| 2006/0271526 A1 | 11/2006 | Charnock et al. | |
| 2007/0022329 A1 | 1/2007 | Adamek et al. | |
| 2007/0064627 A1 | 3/2007 | Campos | |
| 2007/0198568 A1 * | 8/2007 | Luo et al. ...................... 707/102 |
| 2007/0274687 A1 | 11/2007 | Varekamp et al. | |
| 2008/0027917 A1 | 1/2008 | Mukherjee et al. | |
| 2008/0154862 A1 | 6/2008 | Henriot | |
| 2008/0183682 A1 | 7/2008 | Lang et al. | |
| 2008/0183695 A1 | 7/2008 | Jadhav | |
| 2008/0316988 A1 | 12/2008 | Lee et al. | |

(Continued)

OTHER PUBLICATIONS

Arya, et al., "Algorithms for Fast Vector Quantization", retrieved on Jun. 29, 2010 at <<http://www.cs.umd.edu/~mount/Papers/DCC.pdf>>, IEEE Press, Proceedings of Data Compression Conference (DCC), 1993, pp. 381-390.

(Continued)

*Primary Examiner* — Etienne Leroux

(74) *Attorney, Agent, or Firm* — Lee & Hayes, PLLC

(57) ABSTRACT

Techniques for constructing an optimized kd-tree are described. In an implementation, an optimized kd-tree process receives input of a set of data points applicable for large-scale computer vision applications. The process divides the set of the data points into subsets of data points with nodes while generating hyperplanes (e.g., coordinate axes). The process identifies a partition axis for each node based on the coordinate axes combined in a binary way. The optimized kd-tree process creates an optimized kd-tree that organizes the data points based on the identified partition axis. The organization of the data points in the optimized kd-tree provides efficient indexing and searching for a nearest neighbor.

20 Claims, 9 Drawing Sheets

(56) References Cited

U.S. PATENT DOCUMENTS

| | | | |
|---|---|---|---|
| 2009/0024586 | A1 | 1/2009 | Zhou |
| 2009/0210413 | A1 | 8/2009 | Hayashi et al. |
| 2009/0234829 | A1 | 9/2009 | Gollapudi et al. |
| 2010/0017600 | A1* | 1/2010 | Lepeska et al. ............... 713/163 |
| 2010/0114871 | A1 | 5/2010 | Cheong et al. |
| 2010/0177955 | A1 | 7/2010 | Simakov et al. |
| 2011/0060750 | A1 | 3/2011 | Kuhn et al. |
| 2011/0151898 | A1 | 6/2011 | Chandra et al. |
| 2011/0208429 | A1 | 8/2011 | Zheng et al. |

OTHER PUBLICATIONS

Arya, et al., "An Optimal Algorithm for Approximate Nearest Neighbor Searching in Fixed Dimensions", retrieved on Jun. 29, 2010 at <<http://citeseerx.ist.psu.edu/viewdoc/download?doi=10.1.1.15. 3125&rep=rep1&type=pdf>>, Journal of the ACM (JACM), vol. 45, No. 6, Nov. 1998, pp. 891-923.

Beis, et al., "Shape Indexing Using Approximate Nearest-Neighbour Search in High-Dimensional Spaces", retrieved on Jun. 29, 2010 at <<http://citeseerx.ist.psu.edu/viewdoc/download?doi=10.1.1.23. 9493&rep=rep1&type=pdf>>, IEEE Computer Society, Proceedings of Conference on Computer Vision and Pattern Recognition (CVPR), 1997, pp. 1-7.

Bentley, "Multidimensional Binary Search Trees Used for Associative Searching", retrieved on Jun. 29, 2010 at <<http://delivery.acm.org/10.1145/370000/361007/p509-bentley.pdf?key1=361007&key2=5628787721&coll=GUIDE&dl=GUIDE&CFID=93368497&CFTOKEN=43654112>>, Communications of the ACM, vol. 18, No. 9, Sep. 1975, pp. 509-517.

Bishnu, et al., "Euler Vector for Search and Retrieval of Gray-Tone Images", retrieved on Jun. 29, 2010 at <<http://citeseerx.ist.psu.edu/viewdoc/download?doi=10.1.1.60.4767&rep=rep1&type=pdf>>, IEEE Transactions on Systems, Man, and Cybernetics—Part B: Cybernetics, vol. 35, No. 4, Aug. 2005, pp. 801-812.

Bohm, et al., "Searching in High-Dimensional Spaces—Index Structures for Improving the Performance of Multimedia Databases", retrieved on Jun. 29, 2010 at <<http://astrometry.net/svn/trunk/documents/papers/dstn-review/papers/bohm2001.pdf>>, ACM Computing Surveys, vol. 33, No. 3, Sep. 2001, pp. 322-373.

Breiman, "Random Forests", retrieved on Jun. 29, 2010 at <<http://citeseerx.ist.psu.edu/viewdoc/download?doi=10.1.1.23.3999&rep=rep1&type=pdf>>, Kluwer Academic Publishers, Machine Learning, vol. 45, No. 1, 2001, pp. 5-32.

Brown, et al., "Recognising Panoramas", retrieved on Jun. 29, 2010 at <<http://www.google.com/url?sa=t&source=web&cd=2&ved=0CBgQFjAB&url=http%3A%2F%2Fciteseerx.ist.psu.edu%2Fviewdoc%2Fdownload%3Fdoi%3D10.1.1.1.9896%26rep%3Drep1%26type%3Dpdf&rct=j&q=Recognising+panoramas&ei=--MqTOK4KIL78AaOosjUCA&usg=AFQjCNGwKw76vr856obtqLIWvptiLlamjw>>, IEEE Computer Society, Proceedings of International Conference on Computer Vision (ICCV), 2003, pp. 12-18.

Chen, et al., "Fast Image Database Search using Tree-Structured VQ", retrieved on Jun. 30, 2010 at <<http://ieeexplore.ieee.org/stamp/stamp.jsp?tp=&arnumber=638624>>, IEEE Proceedings of International Conference on Image Processing, Santa Barbara, CA, vol. 2, Oct. 1997, pp. 827-830.

Datar, et al., "Locality Sensitive Hashing Scheme Based on p-Stable Distributions", retrieved on Jun. 29, 2010 at <<http://dimacs.rutgers.edu/Workshops/Streamingll/datar-slides.pdf>>, ACM, Proceedings of Symposium on Computational Geometry, Brooklyn, NY, 2004, pp. 253-262.

Friedman, et al., "An Algorithm for Finding Best Matches in Logarithmic Expected Time", retrieved on Jun. 29, 2010 at <<http://delivery.acm.org/10.1145/360000/355745/p209-freidman.pdf?key1=355745&key2=3779787721&coll=GUIDE&dl=GUIDE&CFID=93370504&CFTOKEN=86954411>>, ACM Transactions on Mathematical Software, vol. 3, No. 3, Sep. 1977, pp. 209-226.

He, et al., "An Investigation of Using K-d Tree to Improve Image Retrieval Efficiency", retrieved on Jun. 29, 2010 at <<http://www.aprs.org.au/dicta2002/dicta2002_proceedings/He128.pdf>>, Digital Image Computing Techniques and Application (DICTA), Melbourne, AU, 2002, pp. 1-6.

Jain, et al., "Fast Image Search for Learned Metrics", retrieved on Jun. 29, 2010 at <<http://userweb.cs.utexas.edu/~grauman/papers/jain_kulis_grauman_cvpr2008.pdf>>, IEEE Proceedings of Conference on Computer Vision and Pattern Recognition (CVPR), Jun. 2008, pp. 1-8.

Kulis, et al., "Kernelized Locality-Sensitive Hashing for Scalable Image Search", retrieved on Jun. 29, 2010 at <<http://userweb.cs.utexas.edu/~grauman/papers/iccv2009_klsh.pdf>>, IEEE Proceedings of International Conference on Computer Vision (ICCV), Kyoto, JP, Oct. 2009, pp. 1-8.

Kumar, et al., "What Is a Good Nearest Neighbors Algorithm for Finding Similar Patches in Images?", retrieved on Jun. 29, 2010 at <<http://rangers.googlecode.com/files/Kumar,%20Zhang,%20Nayar%20ECCV%202008%20What%20Is%20a%20Good%20Nearest%20Neighbors%20Algorithm%20for%20Finding%20Similar%20Patches%20in%20Images.pdf>>, Springer-Verlag Berlin, Lecture Notes in Computer Science vol. 5303, Proceedings of European Conference on Computer Vision: Part II (ECCV), Marseille, FR, 2008, pp. 364-378.

Liu, et al., "An Investigation of Practical Approximate Nearest Neighbor Algorithms", retrieved on Jun. 29, 2010 at <<http://www.cs.cmu.edu/~agray/approxnn.pdf>>, Neural Information Processing Systems, 2004, pp. 825-832.

Lowe, "Distinctive Image Features from Scale-Invariant Keypoints", retrieved on Jun. 29, 2010 at <<http://www.google.com/url?sa=t&source=web&cd=1&ved=0CBIQFjAA&url=http%3A%2F%2F-citeseerx.ist.psu.edu%2Fviewdoc%2Fdownload%3Fdoi%3D10.1.1.157.3843%26rep%3Drep1%26type%3Dpdf&rct=j&q=Distinctive+image+features+from+scale-invariant+keypoints&ei=vfAqTOTLGsP98Ab0tdDUCA&usg=AFQjCNFBJBYZ-0JaLULiTVsKb30kPeJI8w>>, Kluwer Academic Publishers, International Journal of Computer Vision, vol. 60, No. 2, 2004, pp. 91-110.

Luque, et al., "Broad-Phase Collision Detection Using Semi-Adjusting BSP-trees", retrieved on Jun. 29, 2010 at <<http://www.inf.ufrgs.br/~comba/papers/2005/sabsp-i3d05.pdf>>, ACM, Proceedings of Symposium on Interactive 3D Graphics and Games, Washington, DC, 2005, pp. 179-186.

MacDonald, et al., "Heuristics for ray tracing using space subdivision", retrieved on Jun. 29, 2010 at <<https://svn.origo.ethz.ch/stefaray/trunk/ex3/splittingstrategy.pdf>>, Springer-Verlag, The Visual Computer, vol. 6, 1990, pp. 153-166.

McNames, "A Fast Nearest Neighbor Algorithm Based on a Principal Axis Search Tree", retrieved on Jun. 29, 2010 at <<http://citeseerx.ist.psu.edu/viewdoc/download;jsessionid=33420E157D7A5074E94129084F26027C?doi=10.1.1.9.181&rep=rep1&type=pdf>>, IEEE Transactions on Pattern Analysis and Machine Intelligence (PAMI), vol. 23, No. 9, Sep. 2001, pp. 964-976.

Mikolajczyk, et al., "Improving Descriptors for Fast Tree Matching by Optimal Linear Projection", retrieved on Jun. 29, 2010 at <<http://cmp.felk.cvut.cz/~matas/papers/mikolajczyk-msift-iccv07.pdf>>, IEEE International Conference on Computer Vision (ICCV), 2007, pp. 1-8.

Moore, "The Anchors Hierarchy: Using the Triangle Inequality to Survive High Dimensional Data", retrieved on Jun. 29, 2010 at <<http://www.autonlab.org/autonweb/14660/version/2/part/5/data/moore-anchors.pdf?branch=main&language=en>>, Morgan Kaufmann Publishers, Proceedings of Conference on Uncertainty in Artificial Intelligence, 2000, pp. 397-405.

Muja, et al., "Fast Approximate Nearest Neighbors with Automatic Algorithm Configuration", retrieved on Jun. 29, 2010 at <<http://www.google.com/url?sa=t&source=web&cd=1&ved=0CBcQFjAA&url=http%3A%2F%2Fciteseerx.ist.psu.edu%2Fviewdoc%2Fdownload%3Fdoi%3D10.1.1.160.1721%26rep%3Drep1%26type%3Dpdf&rct=j&q=Fast+approximate+nearest+neighbors+with+automatic+algorithm+configuration&ei=3fQqTKXMJYL78Ab_ocjUCA&usg=AFQjCNHIDSidHmXcXYddja1HuNmBUxnHuA>>, International.

(56) References Cited

OTHER PUBLICATIONS

Nister, et al., "Scalable Recognition with a Vocabulary Tree", retrieved on Jun. 29, 2010 at <<http://www.google.com/url?sa=t&source=web&cd=1&ved=0CBIQFjAA&url=http%3A%2F%2Fciteseerx.ist.psu.edu%2Fviewdoc%2Fdownload%3Fdoi%3D10.1.1.61.9520%26rep%3Drep1%26type%3Dpdf&rct=j&q=Scalable+Recognition+with+a+Vocabulary+Tree&ei=SvUqTOjgBIL68Ab3srDSCA&usg=AFQjCNF216Kz0etQ9v_TTYH6FJp4D3HX_w>>, IEEE Computer Society, Proceedings of Conference on Computer Vision and Pattern Recognition (CVPR), vol. 2, 2006, pp.
Philbin, et al., "Object retrieval with large vocabularies and fast spatial matching", retrieved on Jun. 29, 2010 at <<http://www.robots.ox.ac.uk/~vgg/publications/papers/philbin07.pdf>>, IEEE Proceedings of the Conference on Computer Vision and Pattern Recognition (CVPR), 2007, pp. 1-8.
Qian, et al., "A Space-Partitioning-Based Indexing Method for Multidimensional Non-Ordered Discrete Data Spaces", retrieved on Jun. 29, 2010 at <<http://citeseerx.ist.psu.edu/viewdoc/download?doi=10.1.1.93.5091&rep=rep1&type=pdf>>, ACM Transactions on Information Systems, vol. 24, No. 1, Jan. 2006, pp. 79-110.
Shakhnarovich (ed.), et al., "Nearest-Neighbor Methods in Learning and Vision: Theory and Practice", retrieved on Jun. 29, 2010 at <<http://vlm1.uta.edu/~athitsos/publications/ann2006_chapter6.pdf>>, The MIT Press, 2005, pp. 1-26.
Shalizi, "Classification and Regression Trees", retrieved on Jun. 29, 2010 at <<http://www.stat.cmu.edu/~cshalizi/350/lectures/22/lecture-22.pdf>>, Carnegie Mellon University, Statistics Course 36-350, Data Mining, Fall 2009, pp. 1-25.
Silpa-Anan, et al., "Optimised KD-Trees for Fast Image Descriptor Matching", retrieved on Jun. 29, 2010 at <<http://mplab.ucsd.edu/wp-content/uploads/CVPR2008/Conference/data/papers/298.pdf>>, IEEE Conference on Computer Vision and Pattern Recognition (CVPR), Anchorage, AK, 2008, pp. 1-8.
Snavely, et al., "Photo Tourism: Exploring Photo Collections in 3D", retrieved on Jun. 29, 2010 at <<http://citeseerx.ist.psu.edu/viewdoc/download?doi=10.1.1.62.910&rep=rep1&type=pdf>>, ACM, International Conference on Computer Graphics and Interactive Techniques, Boston, MA, 2006, pp. 835-846.
Sproull, "Refinements to Nearest-Neighbor Searching in k-Dimensional Trees", retrieved on Jun. 29, 2010 at <<http://trac.astrometry.net/export/13048/trunk/documents/papers/dstn-review/papers/sproull1991.pdf>>, Springer-Verlag New York, Algorithmica, vol. 6, 1991, pp. 579-589.
Torralba, et al., "80 million tiny images: a large dataset for non-parametric object and scene recognition", retrieved on Jun. 29, 2010 at <<http://people.csail.mit.edu/torralba/tmp/tiny.pdf>>, IEEE Transactions on Pattern Analysis and Machine Intelligence (PAMI), vol. 30, No. 11, 2008, pp. 1958-1970.
Toth, "Binary Space Partitions: Recent Developments", retrieved on Jun. 29, 2010 at <<http://www.msri.org/communications/books/Book52/files/29toth.pdf>>, MSRI Publications, Combinatorial and Computational Geometry, vol. 52, 2005, pp. 529-556.
Yianilos, "Data Structures and Algorithms for Nearest Neighbor Search in General Metric Spaces", retrieved on Jun. 29, 2010 at <<http://citeseerxist.psu.edu/viewdoc/download?doi=10.1.1.41.4193&rep=rep1&type=pdf>>, Society for Industrial and Applied Mathematics, Proceedings of Symposium on Discrete Algorithms, Austin, TX, 1993, pp. 311-321.
Aksoy, et al., "Graph-Theoretic Clustering of Image Grouping and Retrieval", IEEE Computer Society Conference on Computer Vision and Pattern Recognition, Jun. 1999, 6 pages.
Arya, et al., "Approximate Nearest Neighbor Queries in Fixed Dimensions", Proceedings of the fourth annual ACM-SIAM Symposium on Discrete algorithms (SODA), Jan. 1993, 10 pages.
Athitsos, et al., "Learning Embeddings for Fast Appoximate Nearest Neighbor Retrieval", Nearest-Neighbor Methods in Learning and Vision Theory and Practice, The MIT Press, Cambridge Massachusettes, Mar. 2006, 26 pages.
Dasigi, et al., "Efficient Graph-based Image Matching for Reconition and Retrieval", Proceedings of National Conference on Computer Vision, Pattern recognition, Image Processing and Graphics (NCVPRIPG-2008), Jan. 2008, 9 pages.
Faloutsos, et al., "A Fast Algorithm for Indexing, Data-Mining and Visualization of Traditional and Multimedia Datasets", Proceedings of the 1995 ACM SIGMOD international conference on Management of data, vol. 24, Issue 2, May 1995, pp. 163-174.
Finkel, et al., "Quad trees: A data structure for retrieval on composite keys", Acta Informatica, vol. 4, Apr. 1974, pp. 1-9.
He, et al., "Scalable Similarity Search with Optimized Kernel Hashing", Proceedings of the 16th ACM SIGKDD international conference on Knowledge discovery and data mining, Jul. 2010, 10 pages.
Jia, et al., "Optimizing kd-Trees for Scalable Visual Descriptor Indexing", 2010 IEEE Conference on Computer Vision and Pattern Recognition (CVPR), Jun. 2010, pp. 3392-3399.
Kulis, et al., "Learning to hash with binary reconstructive embeddings", Technical Report No. UCB/EECS-2009-101, Jul. 2009, 11 pages.
Moore, "The anchors hierarchy Using the triangle inequality to survive high dimensional data", Proceedings of the 16th Conference in Uncertainty in Artificial Intelligence (UAI '00), Jun./Jul. 2000, 9 pages.
Navarro, "Searching in Metric Spaces by Spatial Approximation", IEEE Computer Society String Processing and Information Retrieval Symposium & International Workshop on Groupware, SPIRE/CRIWG 1999, Sep. 1999, 8 pages.
"Nearest Neighbor Search", retrieved on Dec. 15, 2010 at <<http://www8.cs.umu.se/kurser/TDBAfl/VT06/algorithms/BOOK/BOOK4/NODE188.HTM>>, 3 pages.
Raginsky, et al., "Locality-Sensitive Binary Codes from Shift-Invariant Kernels", 23rd Annual Conference on Neural Information Processing Systems (NIPS), Dec. 2009, 9 pages.
Samet, "Foundations of Multidimensional and Metric Data Structure", Computer Science Department, University of Maryland, Sep. 2002, 32 pages.
Samet, "Similarity Searching: Indexing, Nearest Neighbor Finding, Dimensionality Reduction, and Embedding Methods for Applictions in Multimedia Databases", Abstract, 19th International Conference on Pattern Recognition (ICPR 2008), Dec. 2008, 1 page.
Sebasian, et al., "Metric-Based Shape Retrieval in Large Databases", 16th International Conference on Pattern Recognition (ICPR'02)—Aug. 2002, vol. 3, 6 pages.
Sivic, et al., "Efficient Visual Search of Videos Cast as Text Retrieval", IEEE Transactions on Pattern Analysis and Machine Intelligence, vol. 31, No. 4, Apr. 2009, pp. 591-606.
Snavely, et al., "Photo tourism exploring photo collections in 3D", ACM Transactions on Graphics (TOG)—Proceedings of ACM SIGGRAPH 2006, vol. 25, Issue 3, Jul. 2006, 12 pages.
Toussaint, "The Relative Neighbourhood Graph of a Finite Planar Set", Published in Pattern Recognition, vol. 12, Issue 4, 1980, 14 pages.
Vajda, et al., "Graph-Based Approach for 3D Object Duplicate Detection", 10th Workshop on Image Analysis for Multimedia Interactive Services 2009 (WIAMIS '09), May 2009, 4 pages.
Wang, et al., "Semi-Supervised Hashing for Scalable Image Retrieval", 2010 IEEE Conference on Computer Vision and Pattern Recognition (CVPR), Jun. 2010, 8 pages.
Weiss, et al., "Spectral Hashing", Advances in the Neural Information Processing Systems 21: Proceedings of the 2008 Conference (NIPS), Dec. 2008, 8 pages.
Yamaguchi, et al., "Octree-Related Data Structures and Algorithms", IEEE Computer Graphics Applications, vol. 4, No. 1, Jan. 1984, pp. 53-59.
Zighed, et al., "Proximity graphs for image retrieval", pp. 795-802 of "Compstat 2006—Proceedings in Computational Statistics", A Springer Company, Aug.-Sep. 2006, pp. 795-802.
Chavez et al., "Navigating K-Nearest Neighbor Graphs to Solve Nearest Neighbor Searches", In Advances in Pattern-Recognition-Proceedings Second Mexican Conference on Pattern Recognition, MCPR 2010, 10 pages.
Hacid et al, "Content-Based Retrieval in Large Image Databases", IEEE Conf on Granular Computing, May 2006, 4 pages.

(56) References Cited

OTHER PUBLICATIONS

Hacid et al. "Neighborhood Graphs for Indexing and Retrieving Multi-dimensional data", Journal of Intelligent Information Systems, vol. 34, No. 1, Feb. 2010, 19 pages.

Hajebi et al., "Fast Approximate Nearest-Neighbor Search with k-Nearest Neighbor Graph", Proceedings of the Twenty-Second International Joint Conference on Artificial Intelligence, Jul. 2011, pp. 1312-1317.

Mico et al. "A new version of the Nearest-Neighbour Approximating and Eliminating Search Algorithm (AESA) with linear preprocessing time and memory requirements". Pattern Recognition Letters 15, Jan. 1994, 9 pages.

Office action for U.S. Appl. No. 13/091,323, mailed on May 17, 2012, Wang et al, "Hybrid Neighborhood Graph Search for Scalable Visual Indexing", 18 pages.

Scuturici et al., "Topological Representation Model for Image Database Query", Journal of Experimental & Theoretical Artificial Intelligence, vol. 17, No. 1-2 Jan.-Jun. 2005, 17 pages.

Bustos et al., "Pivot Selection Techniques for Proximity Searching in Metric Spaces", In Proceedings of the 11th Conference of the Chielan Computer Science Society(SCC01), IEEE CS Press, Preprint submitted to Elsevier Science on Mar. 2003, 13 pages.

Cayton et al., "A Learning Framework for Nearest Neighbor Search", in Advances in Neural Information Processing Systems, Dec. 2007, 10 pages.

Kursawa et al., "Optimal Pivot Selection Method Based on the Partition and the Pruning Effect for Metric Space Indexes", IEICE Trans Inf. & Syst., vol. E94-D, No. 3, Mar. 2011, 11 pages.

Ozaki et al., "Using the Mutual k-Nearest Neighbor Graphs for Semi-supervised Classification of Natural Language Data", In Proceedings of the Fifteenth Conference on Computational Natural Language Learning, Jun. 2011, 9 pages.

Paredes et al, "Using the k-Nearest Neighbor Graph for Proximity Searching in Metric Spaces", In Proceedings of the 12th String Processing and Information Retrieval, Nov. 2005, 12 pages.

Serrano et al., "Impact of the Initialization in Tree-Based Fast Similarity Search Techniques", SIMBAD 2011, Proc First Intl Conf on Similarity Based Pattern Recognition, Sep. 2011, 14 pages.

Skopal et al., "Improving the Performance of the M-tree Family by Nearest-Neighbor Graphs", in Proceeding of the 11th East European Conference on Advances in Database and Information Systems(ADBIS 2007), Sep. 2007, 16 pages.

Skopal, "Pivoting M-tree: A Metric Access Method for Efficient Simliarity Search", In Proceedings of the Annual International Workshop on Database Texts, Specifications and Objects, Apr. 2004, 11 pages.

Wang et al., "Query-Driven Iterated Neighborhood Graph Search for Scalable Visual Indexing", Aug. 2012, accessed at <http://research.microsoft.com/pubs/172920/TechReport.pdf> on Oct. 12, 2012, 11 pages.

Xu et al., "Nearest Neighbor Search in General Metric Spaces Using a Tree Data Structure with a Simple Heuristic", J. Chem. Int Computer Science, Jul. 2003, 9 pages.

\* cited by examiner

OPTIMIZED KD-TREE FOR SCALABLE SEARCH

BACKGROUND

Searching is a function in research communities of computational geometry and machine learning. In particular, searching plays an important role in many applications for computer vision. Computer vision deals with computational understanding and use of information present in visual images. Computer vision has adopted a searching pattern known as a nearest neighbor (NN) search. The NN search finds points that are closest to a query point. The NN search is adapted for fast matching to establish correspondences of local points between two images, such as wide-baseline matching for 3D modeling from photo databases and panorama building. Furthermore, the NN search technique is used for fast indexing and searching of large databases, such as content-based image and video retrieval.

A problem with the NN search occurs when using a conventional k-dimensional (kd)-tree. The kd-tree is a space-partitioning data structure for organizing points in a k-dimensional space. The conventional kd-tree has nodes that contain data and links to other nodes. The NN search requires a descent down the conventional kd-tree to a leaf node to obtain a first candidate. However, because of the structure of a conventional kd-tree, this first candidate may not be the nearest neighbor to the input point.

As the popularity of computer vision applications continues to grow, there is an increasing opportunity to find a nearest neighbor efficiently in large-scale vision applications.

SUMMARY

This disclosure describes constructing an optimized kd-tree. The optimized kd-tree is generated to represent near-optimal space partitioning, which leads to more efficient searching for a true nearest neighbor.

In an implementation, a process receives input of data points applicable for large-scale vision applications. An optimized kd-tree process divides a set of data points into subsets of data with internal nodes. The nodes generate hyperplanes used to divide a space into subspaces. The process identifies a set of candidate partition axes for each node based on coordinate axes combined in a binary way. The optimized kd-tree process creates an optimized kd-tree that organizes the data points based on the identified candidate partition axes. The organization of the data points in the optimized kd-tree provides efficient indexing and searching for the nearest neighbor of any given point.

In another implementation, a process constructs a data structure that includes a first part by forming a set of candidate partition axes for each node. A candidate partition axis is based at least in part on binary combinations of coordinate axes for each node. The data structure includes a second part identifying the partition axis of each internal node relative to a partition axis of an ancestor node. The data structure may be constructed based at least in part on the first part (i.e., the formed candidate partition axis for each node) and the second part (i.e., the identified partition axis).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Data points may be organized to construct an optimized kd-tree that supports nearest neighbor (NN) searches in computer vision applications. An optimized kd-tree process receives the data points as input and performs various processes on the data points to achieve different purposes. One purpose might be to provide efficient searching by organizing and indexing the data points (i.e., nodes) in an optimized kd-tree. Another purpose might be to index a large number of scale-invariant feature transform (SIFT) features and other types of visual descriptors in an optimized kd-tree for large-scale applications. Another purpose might be matching image descriptors for image retrieval and recognition in an optimized kd-tree. In particular, the optimized kd-tree requires less searching of the nodes, provides access to the nodes in a particular order, and provides access to a certain number of leaf nodes to find the nearest neighbors (NNs) quickly and efficiently. Thus, the organization of data points in the optimized kd-tree is useful for finding the NNs of a particular query point in high dimensional data. Another purpose might be to offer the optimized kd-tree in some manner on a website operated by a service or online provider. Furthermore, there are many other possible uses of the optimized kd-tree.

Creating an optimized kd-tree improves nearest neighbor searching and enables searching for large-scale applications. The process to create an optimized kd-tree includes receiving input of data points from a database or a web page, forming candidate partition axes and identifying the partition axes of nodes relative to partition axes of ancestor nodes, and outputting the data points organized according to the optimized kd-tree.

The optimized kd-tree offers a priority search for a particular query point, in which the cells are searched in order based on the distance of each cell from the query point. The terms "cell" and "node" are used interchangeably in the document. Thus, the cells initially searched include candidates that are more closely located to the query point. The organization of data points reduces the time for searching the optimized kd-tree versus searching in a conventional kd-tree.

While aspects of described techniques can be implemented in any number of different computing systems, environments, and/or configurations, implementations are described in the context of the following illustrative computing environment.

Illustrative Environment

Figure 1:
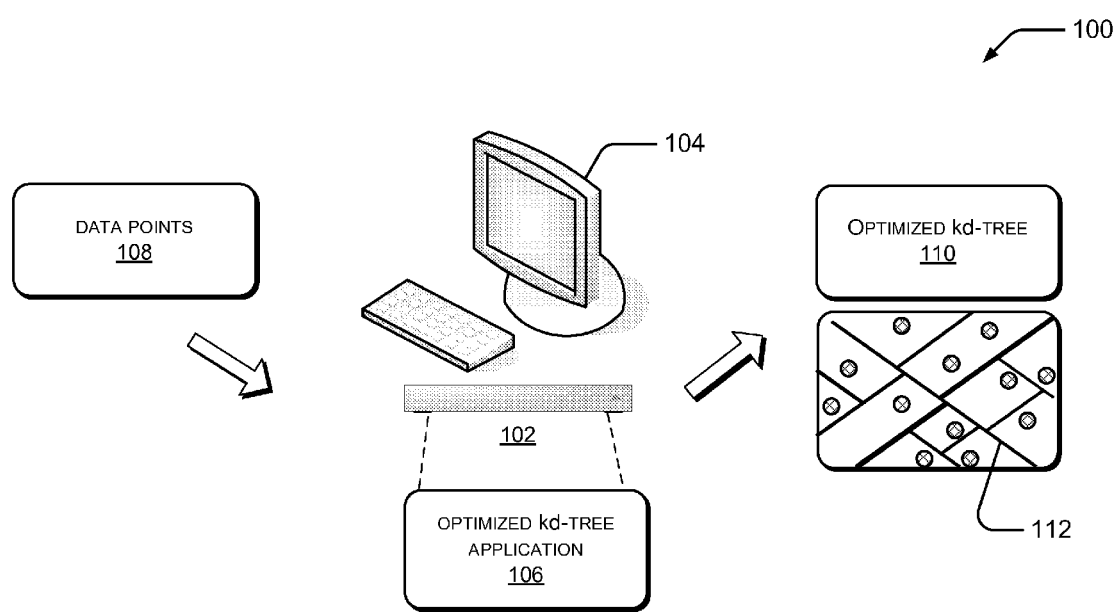
FIG. 1 illustrates an architecture to support an illustrative environment within which constructing an optimized kd-tree may be implemented.

FIG. 1 is a diagram of an illustrative computing environment 100 in which an optimized kd-tree may be constructed.

The environment 100 includes a computing device 102, a monitor 104, and an optimized kd-tree application 106 that performs various functions, such as determining near-optimal space partitioning to support nearest-neighbor searches. The optimized kd-tree application 106 stored in memory on the computing device 102 receives input of data points 108. The optimized kd-tree application 106 organizes and indexes the data points 108 by constructing an optimized kd-tree 110. For example, an output includes the data points 108 organized in the optimized kd-tree 110.

In FIG. 1, the computing device 102 is illustrated as a desktop computer. However, the computing device 102 may take a variety of forms, including, but not limited to, a portable handheld computing device (e.g., a smart phone, a cellular phone), a personal navigation device, a personal digital assistant, a laptop computer, a tablet computer, a netbook, a portable media player, or any other device capable of processing data points and conducting a search of data. The computing device 102 includes the monitor 104 for displaying information, such as results of the indexing and the searching of the optimized kd-tree, along with displaying data in the optimized kd-tree. Details of the computing device 102 follow with reference to FIG. 8.

The optimized kd-tree application 106 performs many functions such as determining near-optimal space partitioning, indexing the data points 108, searching for a true NN, and the like. Furthermore, to build or to construct the optimized kd-tree 110, the optimized kd-tree application 106 identifies candidate partition axes to be formed based on a binary combination of coordinate axes, and identifies the partition axes of each node, such as whether a candidate partition axis is orthogonal or parallel to the partition axis of an ancestor node. The term orthogonal may refer to the partition axes pertaining to being perpendicular to or at right angles. Thus, the identifying the partition axis of each node relative to the partition axis of its ancestor nodes, includes being orthogonal, parallel, or other positions ranging from orthogonal to parallel.

The optimized kd-tree application 106 may be a component or a module that encompasses any functionality for performing a task. The optimized kd-tree application 106 may be a component that includes additional sub-components, sub-modules, or works in conjunction with other modules or components to perform the operations discussed below. In an implementation, the functions and operations described as being performed by the optimized kd-tree application 106, may be performed by an algorithm. Details of example sub-components of the optimized kd-tree application 106 are discussed below with reference to FIG. 9.

The data points 108 may be received from databases, web sites, and the like. The term "data points" may refer to a continuous space, a group of data items, a collection of data sets, a set of data points, a patch data set, image elements, objects, recognition benchmark images, tiny images, scale-invariant feature transform (SIFT) features, high dimensional data, small scale images, and the like.

The output optimized kd-tree 110 may include, but is not limited to, the data points in a single optimized kd-tree, the optimized kd-tree in a database, multiple randomized optimized kd-trees that are index based, and other ways of presenting the data points in the optimized kd-tree.

The data points 108 are shown organized in a generated optimized kd-tree 110. The partition axes 112 shown are either orthogonal or parallel to those of its ancestors. NN searches may be performed by calculating a distance from a query point to the data points 108 (i.e., the small circles) organized in the optimized kd-tree 110.

Figure 2:
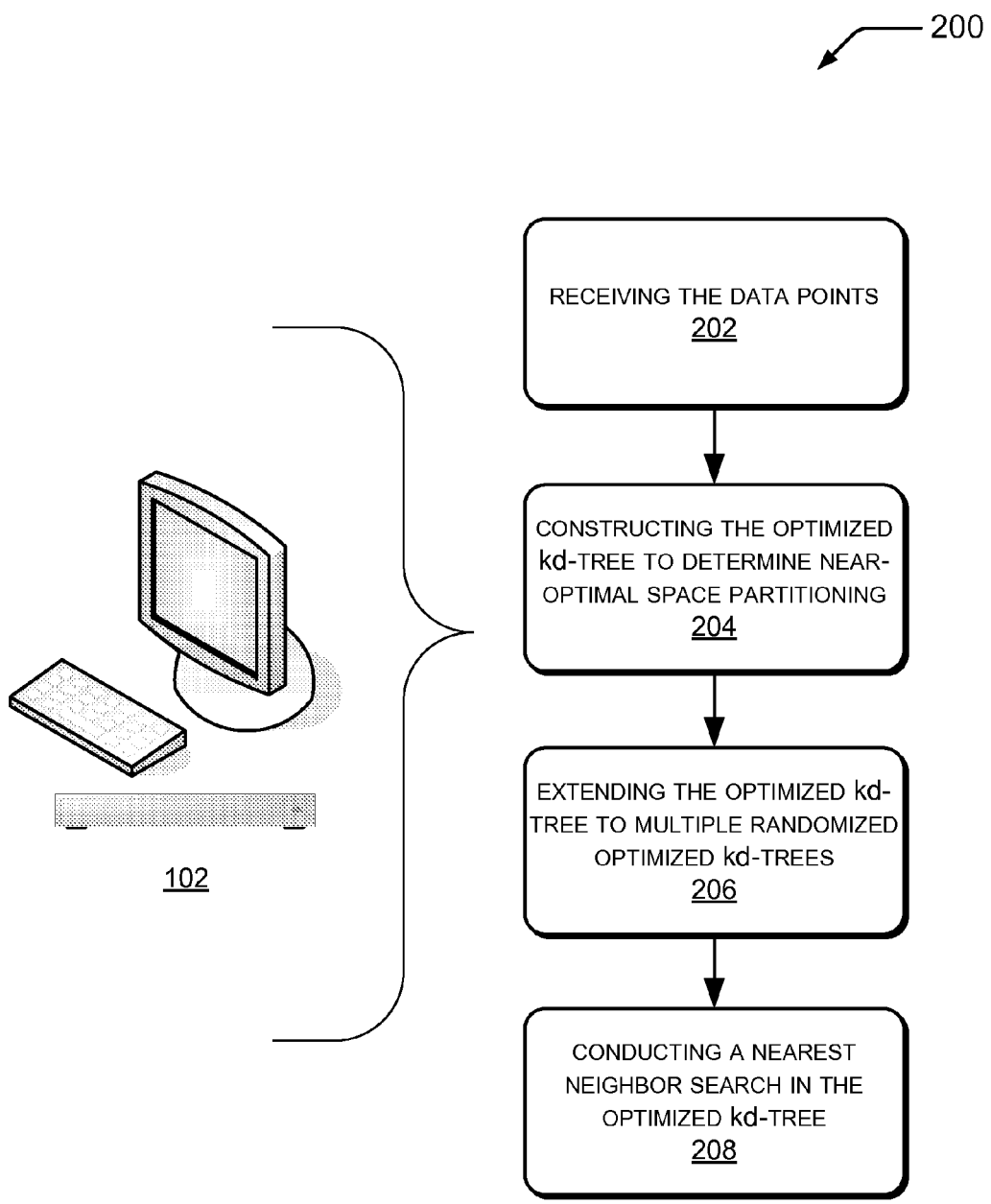
FIG. 2 is a flowchart showing illustrative phases for constructing the optimized kd-tree for use by the architecture of FIG. 1.

FIG. 2 is a flowchart showing an illustrative overview process 200 of high level functions performed in the environment of FIG. 1. The process 200 includes four phases to be performed by the optimized kd-tree application 106, an initial phase 202 to receive data points, a second phase 204 to construct the optimized kd-tree to determine near-optimal space partitioning, a third phase 206 to extend the optimized kd-tree to multiple randomized optimized kd-trees, and a fourth phase 208 to conduct a nearest neighbor search in the optimized kd-tree. Each of the illustrated phases may be implemented in the environment of FIG. 1, may be performed separately or in combination, and without any particular order.

The first phase is receiving the data points 202. This phase represents a process for receiving data points for computer vision applications, large-scale applications, and high dimensional data. In one example, the data points 108 may include images downloaded from web pages. In another example, the data points 108 may include a collection of images received from a database.

The second phase is constructing the optimized kd-tree to determine near-optimal space partitioning 204. This phase represents a process that may include only a single act or two acts, such as forming partition axes based on a binary combination of coordinate axes, and identifying whether the partition axes are orthogonal or parallel with the partition axis of the ancestors.

The third phase is extending the optimized kd-tree to multiple randomized optimized kd-trees 206. This extension to multiple trees in the phase helps increase the performance of a NN search.

The fourth phase is conducting a NN search in the optimized kd-tree 208. This phase is performed in response to the optimized kd-tree application 106 executing on the computing device 102 receiving a query point. The NN search accesses nodes of the optimized kd-tree in order based on a distance of each node from the query point. Thus, the nodes are initially searched in the optimized kd-tree that includes candidates that are more closely matched to the query point, having a greater probability of finding as the NN. Details of the high level functions illustrated in FIG. 2 are further discussed with reference to FIGS. 3-9 below.

Example of Binary Combination of Coordinate Axes and Optimized kd-Tree

Figure 3A:
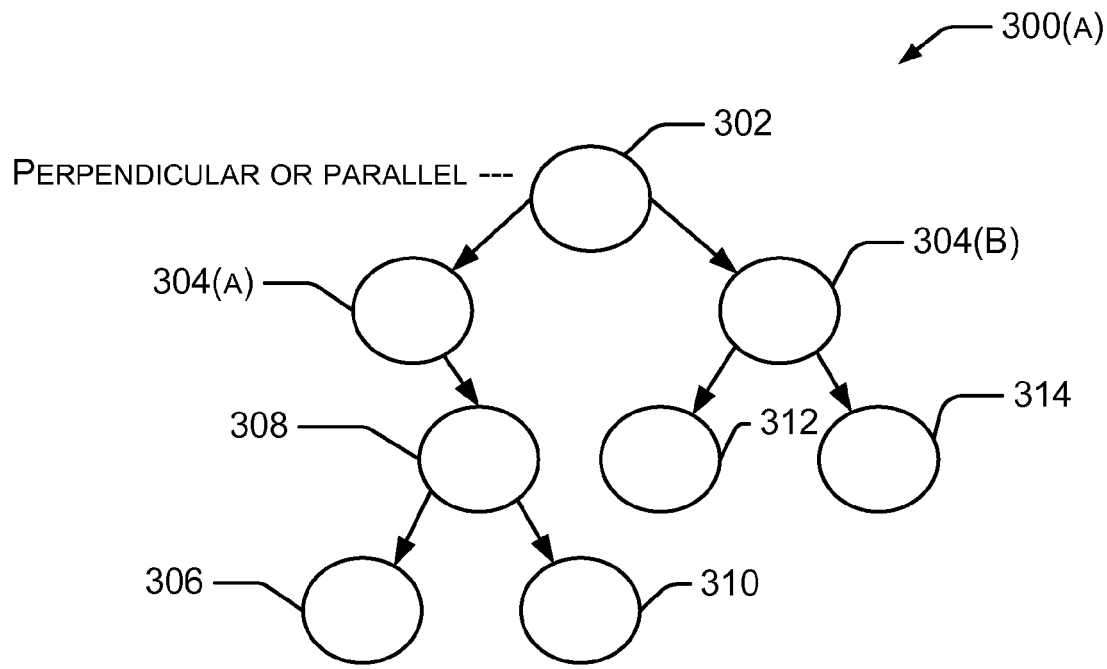
FIG. 3A illustrates an example of the optimized kd-tree and FIG. 3B illustrates a binary combination of coordinate axes for the optimized kd-tree.
Figure 3B:
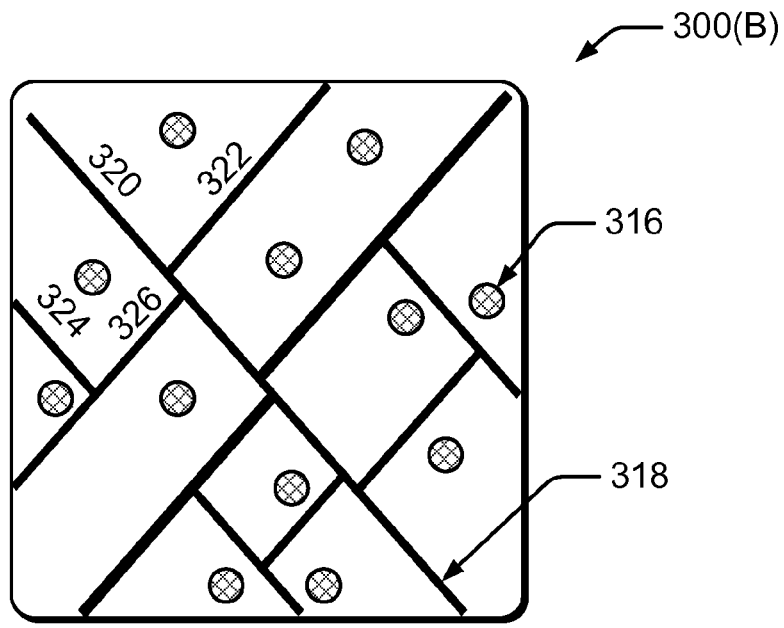

FIG. 3A illustrates an example 300(A) of an optimized kd-tree and FIG. 3B illustrates an example 300(B) of a binary combination of coordinate axes. The figures illustrate the results of the phases (discussed at a high level above) of constructing the optimized kd-tree. For instance, the optimized kd-tree application 106 receives the data points (i.e., the nodes) and constructs the data structure with nodes for the optimized kd-tree 110.

Shown in an upper half of the figure is FIG. 3A, which represents an example of the optimized kd-tree 300(A). The illustrative optimized kd-tree 300(A) illustrates constructing a hierarchical tree structure with a set of linked nodes. Each of the nodes contains data, values, conditions, data elements, and links to other nodes. Every node is a k-dimensional point in the optimized kd-tree.

The optimized kd-tree 300(A) represents a binary tree, where each node has at the most two children. A top node in the optimized kd-tree 300(A) is known as a root node 302. For example, the optimized kd-tree application 106 constructs the optimized kd-tree by dividing the points recursively, where the root node 302 corresponds to the overall data points. Next, the optimized kd-tree application 106 further divides a set of points corresponding to an internal node, identifying a partition hyperplane as part of the process. In particular, the optimized kd-tree application 106 determines the partition hyperplane from the partition axis and a partition value. The partition value represents a median value of the projection of the data points (e.g., in an internal node) being put into the subtree, with respect to the coordinates in the partition axis being used to create the partition hyperplane.

The partition hyperplane should be orthogonal or parallel to a partition hyperplane of an ancestor node. Each half is assigned to one child node, and is recursively split in a same manner to create a balanced binary tree. For instance, each node in the optimized kd-tree 300(A) may have zero or more child nodes, which are shown below as "subtrees" in the optimized kd-tree 300(A). Each node corresponds to a cell that is bounded by a set of partition hyperplanes. For example, the root node 302 may have two child nodes 304(A) and 304(B). The internal node is any node of the optimized kd-tree 300(A) that has child nodes. A node that has a child is known as a child's parent node or the ancestor node. The node that may be the parent node to the child 304(A) or 304(B), may be the root node 302. The root node 302 is a node without any parents or ancestors. A node without any children is a leaf node represented by 306. A left subtree may be represented by the nodes 304(A), 306, 308, and 310.

A root-to-leaf path is a sequence of nodes in the optimized kd-tree 300(A) starting with the root node 302 and proceeding down to a leaf node. A partition hyperplane along the root-to-leaf path should be orthogonal or parallel to a partition axis. The partition axis is a suboptimal binary combination of the coordinate axes. The partition axis being orthogonal or parallel helps calculate a distance from a query point to a node, resulting in a shorter calculation time. For example, there are four root-to-leaf paths shown in 300(A). For example, a first path starts at 302 and ends at node 306. In this first path, the root node 302 should be orthogonal or parallel to the node 304(A), the node 304(A) should be orthogonal or parallel to the node 308, and so forth. Also shown are a second path that starts at 302 and ends at 310, a third path that starts at 302 and ends at 312 and a fourth path that starts at 302 and ends at 314.

Shown in a lower half of the document is FIG. 3B, which illustrates an example of a binary combination of coordinate axes 300(B). A conventional kd-tree is often represented by single coordinate axis. Shown here, the partition axis may be represented by a suboptimal binary combination of the coordinate axes. The optimized kd-tree application 106 determines the partition axis by identifying a set of candidate partition axis by finding the binary combinations of top coordinate axes having larger variances. In some instances, the partition axis may be viewed as an approximation of a true coordinate axis with a greatest variance, as a principal axis. Next, the optimized kd-tree application 106 selects the partition axes that are orthogonal or parallel with the partition axes of the ancestor nodes. The term "binary" indicates whether a coordinate axis contributes as the partition axis. The coordinate axes that are identified in building the optimized kd-tree 300(B) are recorded and tracked. To promote efficiency in the optimized kd-tree 300(B), the partition hyperplanes from the root-to-leaf path should be orthogonal or parallel to the partition axis of the ancestor node along the path.

The data points 108 received are represented as small circles 316, which are inserted by selecting a median of the points being put into the optimized kd-tree 300(A).

Evaluating the binary combinations of the coordinate axes would be very time consuming so a list of top d coordinate axes ranked by variances are identified. The partition axis with a large variance is selected from the binary combinations. The partition axes are represented as dark lines 318, processed either orthogonal or parallel to partition axis of the ancestor nodes. The binary combination of coordinate axes 300(B) illustrates how there is improved space partitioning for data point organization and efficient branching for tree traversing.

The binary combination of coordinate axes 300(B) illustrates the candidate partition axes formed and identified. For example, a partition axis that has been formed and identified may be represented by the axis 320 in the binary combination of coordinate axes 300(B). This partition axis 320 is further processed orthogonal to an axis, that is represented by an axis 322. The axis 322 may be a coordinate axis. The binary combination of axes may be represented by 320 and 322.

In another implementation, the partition axis that has been formed and identified may be represented by 320 in the binary combinations of coordinate axes 300(B). The binary combination of coordinate partition axis 320 may also be parallel with the axis represented by 324. The binary combination may be represented by axes 320 and 324 in one combination. In another, the binary combination may be represented by the axes 324 and 326.

Exemplary Processes

FIGS. 4-7 are flowcharts showing illustrative processes for the phases mentioned above and illustrated in FIG. 2. Each of the processes is illustrated as a collection of blocks in a logical flowchart, which represents a sequence of operations that can be implemented in hardware, software, or a combination thereof. For discussion purposes, the processes are described with reference to the computing environment 100 shown in FIG. 1 and the high level functions described below with reference to FIG. 2. However, the processes may be performed using different environments and devices. Moreover, the environments and devices described herein may be used to perform different processes.

For ease of understanding, the methods are delineated as separate operations represented as independent blocks in the figures. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible for one or more of the provided steps to be omitted.

Receive Data Points

Figure 4:
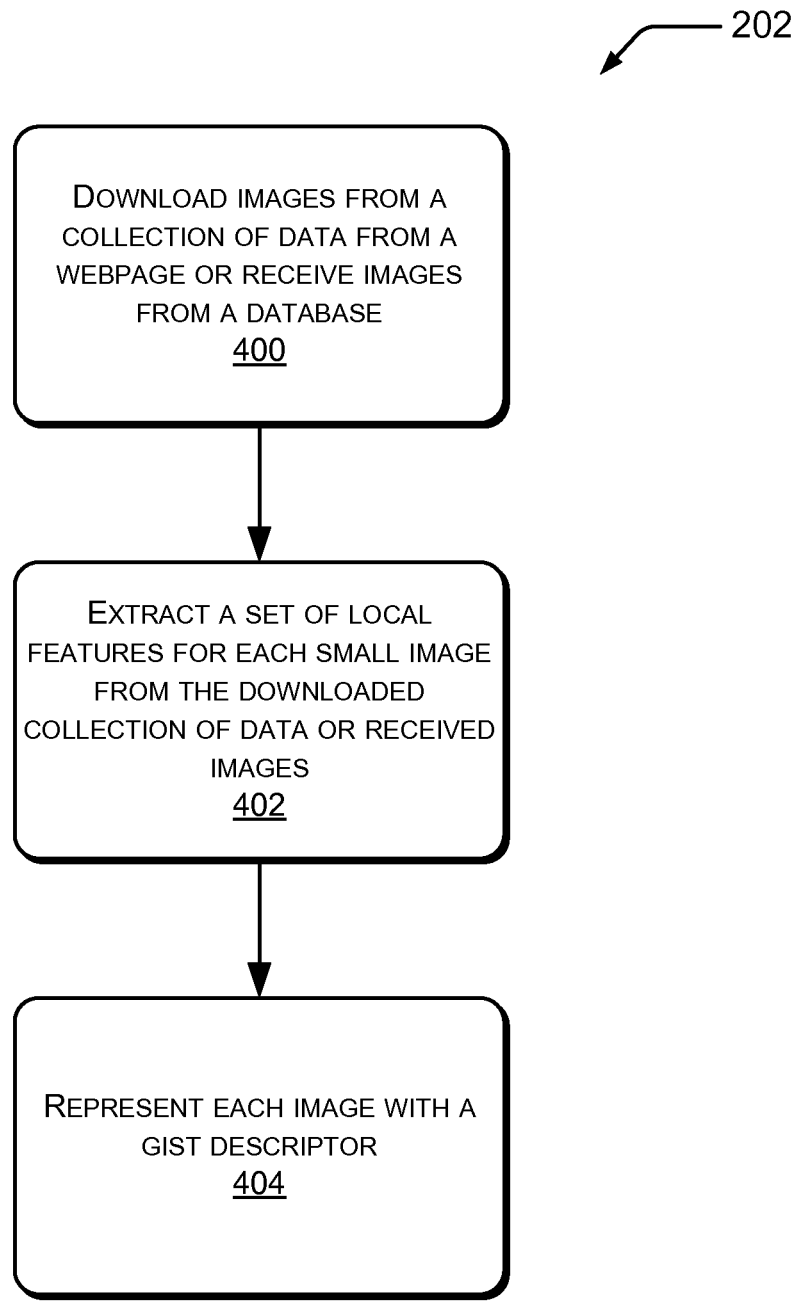
FIG. 4 is a flowchart showing an illustrative process for receiving data points to be organized in the optimized kd-tree.

FIG. 4 illustrates an example process for performing the phase (discussed at a high level above) of receiving the data points 202. As described above, the data points 108 are used in constructing the optimized kd-tree. In some instances, the optimized kd-tree may be part of multiple optimized kd-trees or a portion of an optimized kd-tree database. An example optimized kd-tree database stores the information of the generated optimized kd-trees.

At block 400, the optimized kd-tree application 106 downloads images from a collection of data from a webpage or receives images from a database. The data or images may include many forms but are not limited to video sequences, views from cameras, multi-dimensional data from scanners, digital images, microscopy images, x-ray images, ultrasonic images, angiography images, tomography images, and the like. For example, the data or the images may include a group of images that correspond to digital images having data items associated with respective image elements.

The data points 108 may be represented as a set of n data points, such as $\chi = \{x_1, \ldots, x_n\}$ with $x_i \in \mathcal{R}^k$ being a k-dimensional point and $\mathcal{R}^k$ representing a k-dimensional point within the space.

At block 402, the optimized kd-tree application 106 extracts a set of local features for each small image, from the downloaded collection of data or received images. Small images are approximately 32 pixels in size. For example, the optimized kd-tree application 106 may extract maximally stable external regions (MSERs) for each small scale image, and may further extract a 128-dimensional SIFT feature for each MSER. The sets of the local features are integrated to build the optimized kd-tree.

At block 404, the optimized kd-tree application 106 represents each image with a GIST descriptor. For example, the collection of data or the received images may convey various fields of information. For instance, the images or web-scale images may need to be described. These images may be described by a global GIST descriptor. In an example implementation, the GIST descriptor is a 384-dimensional vector describing an image within a localized grid cell. Another type of descriptor may describe characteristics of the information that include but are not limited to, image elements associated with a shape, a color, a texture, a region, a motion, and others. There is no limitation placed on the criterion or criteria in defining the information conveyed.

In an implementation, the optimized kd-tree application 106 receives 9,000 images and extracts a set of local features for each image. The optimized kd-tree application 106 extracts maximally stable external regions (MSERs) for each image, and further extracts a 128-dimensional SIFT feature for each MSER. From this extraction, there are approximately 4,000 SIFT features for each image. As a result, the optimized kd-tree application 106 randomly samples 300 k data points from the 4,000 k SIFT feature points to create the optimized kd-tree that is part of a database for searching.

In another implementation, the optimized kd-tree application 106 receives data from "tiny images." The data includes 80 million images from the "tiny images," which are approximately 32×32 pixels in size. The global GIST descriptor represents each image, describing the texture within the localized grid cells. Next, the optimized kd-tree application 106 randomly samples 200 k images from 1.5M images downloaded to help build the optimized kd-tree that is part of a database for searching.

In yet another implementation, the optimized kd-tree application 106 receives local image patches of Flickr® photos of various landmarks. Local image patches are part of a data set associated with photo tourism projects. The optimized kd-tree application 106 computes correspondence between local features across multiple images, which may be provided to a structure-from-motion algorithm to generate 3D reconstructions of the photographed landmark. One of the tasks is to take an input patch and retrieve its corresponding patches within any other images in the database, which is a large-scale similarity problem. In an implementation, the optimized kd-tree application 106 receives 400 k image patches from a landmark, the Notre Dame Cathedral and 60 k image patches as queries.

Construct Optimized kd-Tree

Figure 5:
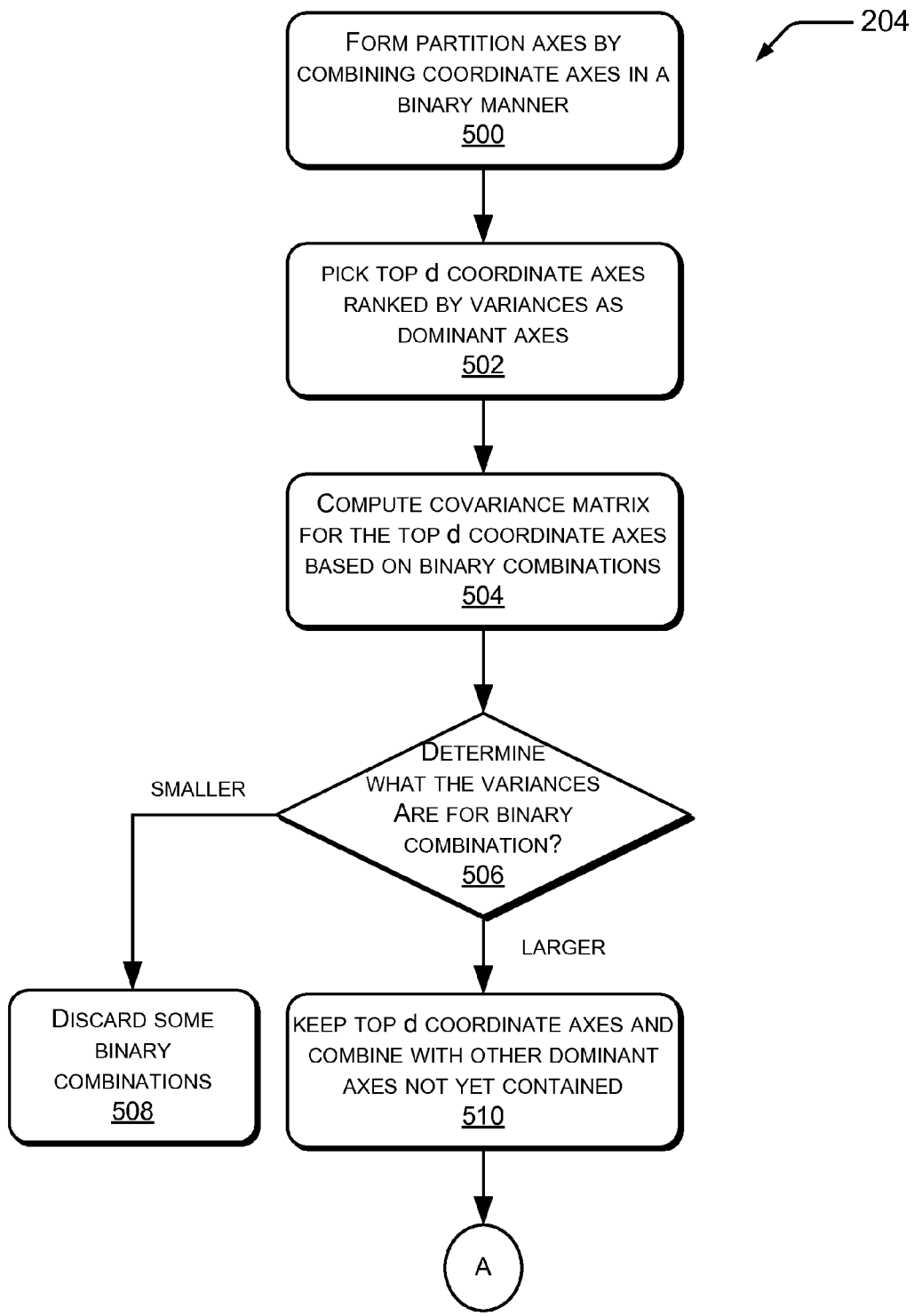
FIG. 5 is a flowchart showing an illustrative process for forming a candidate partition axis for the optimized kd-tree.
Figure 6:
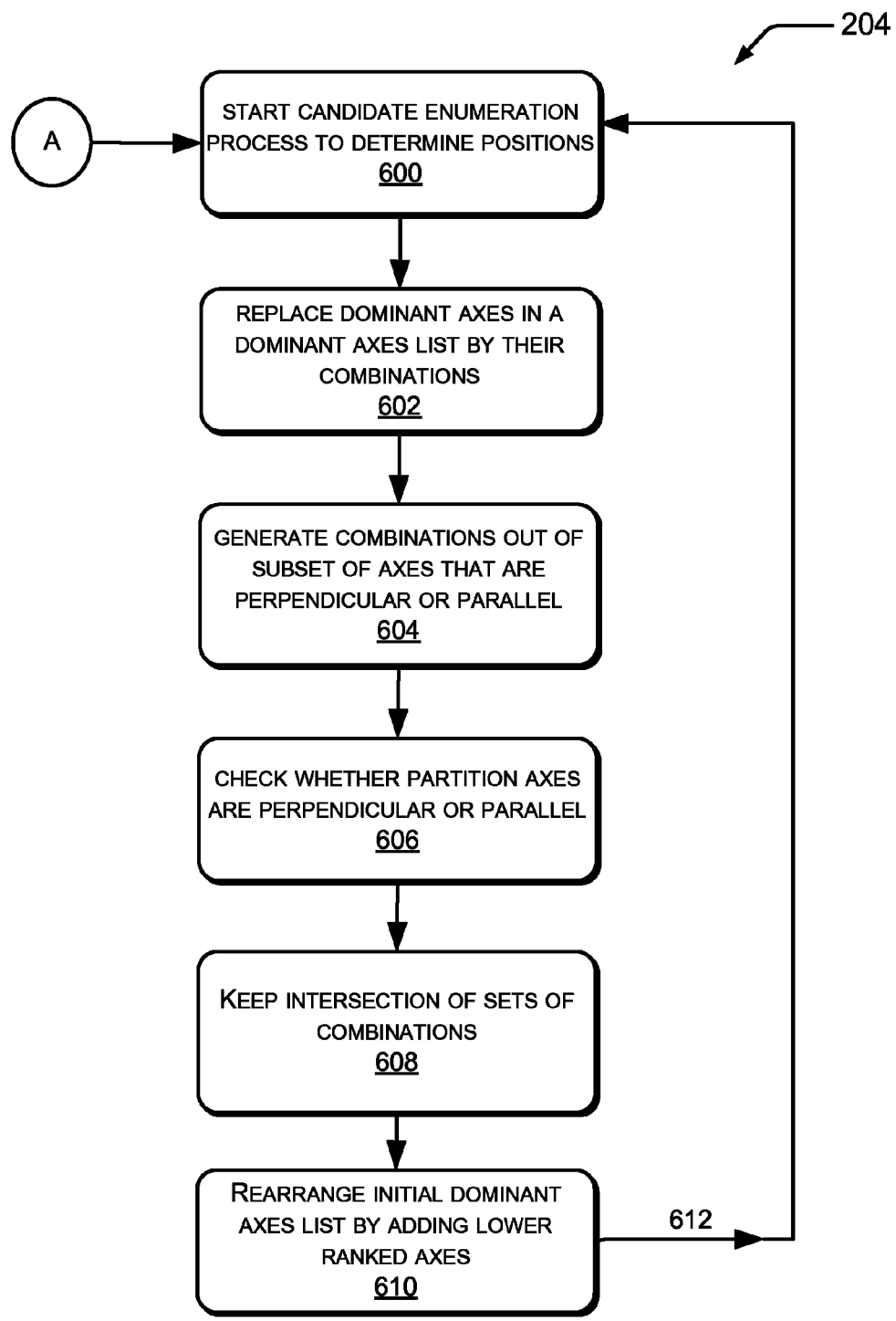
FIG. 6 is a flowchart showing an illustrative process for identifying the partition axis of each node relative to a partition axis of an ancestor node for the optimized kd-tree.

FIGS. 5 and 6 illustrate example processes for performing the second phase (discussed at high level above) of constructing the optimized kd-tree to find the near optimal space partitioning 204. This phase may include one or two parts, such as forming the candidate partition axes to be discussed with reference to FIG. 5 and identifying the partition axes relative to the partition axes of its ancestors to be discussed with reference to FIG. 6.

The optimized kd-tree application 106 receives as input the data points 108, as shown in FIGS. 1 and 2. This input of data points is received and processed to construct the optimized kd-tree.

At block 500, the optimized kd-tree application 106 forms candidate partition axes by combining the coordinate axes in a binary manner. This process may be a first part in constructing a data structure to organize the data points 108. The candidate partition axes are identified as part of the process. Assuming there is a set of unit vectors that exist along the k coordinate axes, the vectors may be represented by $\{n_1, n_2, n_3 \ldots n_k\}$. An element in a set of candidate partition axes in the optimized kd-tree process may be written as:

$$\frac{1}{\sqrt{l}} \sum_{i=1}^{k} w_i \times n_i, w_i \in \{-1, 0, 1\}.$$

The element l is a number of non-zero entities in a weight vector $[w_1, w_2, w_3, \ldots w_k]^T$ which may be used for normalization. The term binary indicates a choice for the values of the weights, either absent, or contribute one unit of its corresponding axis vector $n_i$ in either direction. The terms $\{-1,0,1\}$ represent constraints that may be associated with an entry projection vector. For discussion purposes, "candidate partition axes" may be referred to as the partition axes, which may be accepted or rejected as partition axes used in building the optimized kd-tree.

Based on the number of available partition axes growing from k to $(3^k-1)/2$, a probability of finding a vector close to one of the first few principal components would become much higher. In addition, the projection operation of any point onto such a partition axis may take (l–1) addition operations. A small value for l, such as five or ten, may suffice for most nodes, and may save a considerable amount of time over a projection that would take O(k) multiplications.

For large scale problems, it may be computationally expensive to compute the variances for each binary combination. Computing a complete covariance matrix concerning all dimensions for each node may be too computationally expensive, even for offline processing. One way to avoid this expensive computation is to perform a partial covariance calculation, which is efficient and effective in computation costs. As a result, the optimized kd-tree application 106 evaluates the binary combinations by introducing an approximate, but effective way that only needs to compute a partial covariance matrix over a few dimensions for each node. This saves costs and time in processing, especially for high dimensional and/or large-scale applications. The computation of a partial covariance matrix is discussed below.

At block 502, the optimized kd-tree application 106 picks top d coordinate axes ranked by variances as dominant axes. Based on this selection, the optimized kd-tree application 106 identifies or selects the candidate partition axes. The variance may be used as one of several descriptors of a distribution to indicate how far values lie from a mean value.

At block 504, the optimized kd-tree application 106 computes the covariance matrix for the top d coordinate axes based on the binary combinations. For example, this scheme is based on the following observations. If a binary combination has a large variance, it is very likely that the axes forming the binary combination, will also have large variances. On the other hand, it is possible that a low variance axis may have very strong linear correlations with some other large variance axes. Thus, the strong linear correlations of the low variance axis with the large variance axes may make their combination's variance even larger. However, due to its strong linear correlations with other coordinate axes, it may not be beneficial for partitioning this space.

The number of d coordinate axes may vary, depending on the data points 108 received. In an example implementation, it has been shown that when coping with common visual descriptors, a value around ten may be sufficient for the number of coordinate axes, such as d=10. In another implementation, it has been shown when conducting an approximate nearest neighbor (ANN) search on the optimized kd-tree, the d values may be set to five and to seven. Using d values set to five and to seven, each with five random runs resulted in a small precision loss of only 0.11% and a small variance of $1.44 \times 10^{-5}$.

At block 506, the optimized kd-tree application 106 determines what the variances are for the binary combination. For example, the optimized kd-tree application 106 may speed up the construction of the optimized kd-tree 110 by enumerating the binary combinations of the candidate partition axes based at least in part on a greedy pruning scheme. The greedy pruning scheme may be performed in a sequential manner, from single coordinate axes, two-coordinate-axis combinations, to d-coordinate-axis-combinations.

From block 506, if the greedy pruning scheme determines the variances for the binary combination of the candidate partition axes are smaller than other variances, the optimized kd-tree application 106 proceeds along the left side to block 508.

At block 508, the optimized kd-tree application 106 discards some binary combinations of the candidate partition axes that tend to have smaller variances and a large probability of finding the nearest neighbor. The optimized kd-tree application 106 tends to eliminate the candidate partition axes that may not be useful in partitioning the space.

Returning to block 506, if the greedy pruning scheme determines the variances for the binary combination of the candidate partition axes may be larger, the candidate partition axes proceed to block 510.

At block 510, the optimized kd-tree application 106 keeps the top d axes and combines them with other dominant axes that are not yet contained. After finishing each combination size, the top d coordinate axes ranked by variance may be kept as candidate partition axes, each to be further combined with dominant axes that are not yet contained in the optimized kd-tree, thereby forming binary combinations of the next larger size. The greedy pruning scheme reduces a number of checked binary combinations from an exponential function of d to a polynomial one. In an implementation, using small values for the dominant axes, such as d of five and seven, corresponded to pruning out lower ranked combinations. Thus, the greedy pruning scheme tends to keep the useful combinations of the candidate partition axes with large variances, represented as A.

In an implementation, the optimized kd-tree application may perform this act of identifying the candidate partition axes, as part of the second phase. In another implementation, the optimized kd-tree application 106 may further proceed to FIG. 6.

FIG. 6 further illustrates another act that may or may not be included in the second phase of constructing the optimized kd-tree to find the near optimal space partitioning 204. In particular, FIG. 6 illustrates the second part, identifying the partition axes of each node relative to the partition axes of the ancestor nodes. In an implementation, the optimized kd-tree application 106 receives the formed or the identified candidate partition axes as discussed above and represented in FIG. 5 as A. This description is one implementation that may be used, as other implementations of positioning the partition axes may be used.

At block 600, the optimized kd-tree application 106 starts a candidate enumeration process to determine positions. This process may be considered as a second part in constructing the data structure to organize the data points 108. For example, in the optimized kd-tree, the partition axes from the root to leaf should be orthogonal or parallel with partition axis of its ancestors. These types of positions are beneficial in calculating a distance quickly, from the query point to each internal node associated with a subspace (i.e., a cell) in the optimized kd-tree. These types of positions help provide effective computational efforts for high dimensional data that is effective and efficient.

At block 602, the optimized kd-tree application 106 replaces dominant axes identified in a dominant axes list by their combinations. The optimized kd-tree application 106 keeps track of the coordinate axes that have been used in the dominant axes list. The optimized kd-tree application 106 identifies which ancestor node used which coordinate axis while building the optimized kd-tree. For instance, when the optimized kd-tree application 106 uses the dominant axes, the dominant axes list records the dominant axes used in the list. The identified dominant axes are replaced by their combinations, that are either orthogonal or parallel to the partition axes of the ancestors.

At block 604, the optimized kd-tree application 106 generates combinations out of subsets of axes that are orthogonal or parallel. In particular, the binary combinations should be orthogonal or parallel with the partition axes used by the ancestors. The generation of combinations of subsets of axes is based on each ancestor node having used a subset of the axes in the dominant axes list. These added combinations may be included in the later candidate enumeration process. After completing this replacement, additional combinations may become safe and a combination that violates the orthogonality and parallelism condition may not be generated.

At block 606, the optimized kd-tree application 106 checks whether the partition axes are orthogonal or parallel. As mentioned, the candidate partition axes should be orthogonal or parallel with the partition axes of the ancestors. This checking of the candidate partition axes formed by binary combination of the coordinate axes is relatively inexpensive. The checking may be conducted by computing an inner product by using the following equation:

$$v = \sum_{i=1}^{k} w_i^1 w_i^2.$$

In the equation above, v represents an inner product, k represents the k-coordinate axes, and w represents a weight vector.

In an implementation, the value of d is set to ten so the number of dominant coordinate axes is small. As a consequence, the inner product may be reduced to be performed in a sparse operation that may need to add 2d integer variables.

At block 608, the optimized kd-tree application 106 keeps track or a record of an intersection of the sets of combinations. For instance, a dominant axis may be used by more than one ancestor node. When this occurs, only the intersection of the sets of combinations generated with those ancestors concerning this dominant axis is kept to build the optimized kd-tree.

At block 610, the optimized kd-tree application 106 rearranges an initial dominant axes list by adding lower ranked axes. For instance, after performing the partition on this partition axis, the data's variance along the partition axis may be reduced or reduced significantly. Thus, the chances of a coordinate axis appearing in the dominant axes list are minor, small, or insignificant if the coordinate axis is already used in the ancestor node. However, there are instances where a majority of the dominant axes has been used so the dominant axes list becomes limited or smaller after the replacement procedure. In this instance, the optimized kd-tree application 106 may simply rearrange the initial dominant axes list by including additional lower ranked axes.

After block 610, the optimized kd-tree application 106 proceeds right to 612 to perform the candidate combination enumeration again, until there are a sufficient number of candidate combinations.

Once there are a sufficient number of candidate combinations, the optimized kd-tree is constructed. The techniques described provide each generated partition axes and the generated positions of the formed partition axes, as well as the binary combinations formed to construct the optimized kd-tree.

Conducting a Nearest Neighbor Search in the Optimized kd-Tree

Figure 7:
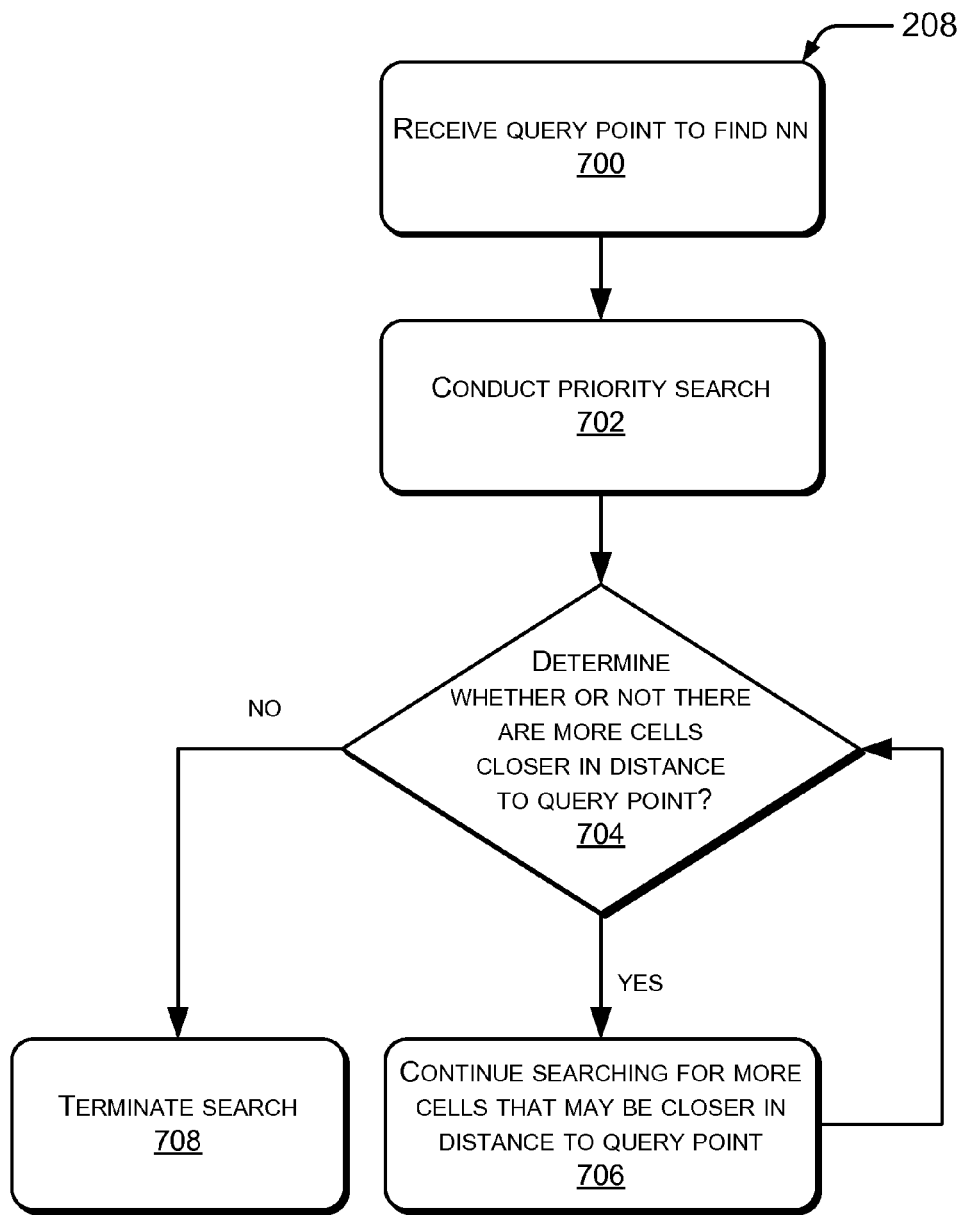
FIG. 7 is a flowchart showing an illustrative process for conducting a nearest neighbor (NN) search in the optimized kd-tree.

FIG. 7 illustrates an example process for performing the phase (discussed at a high level above) of conducting a nearest neighbor (NN) search in the optimized kd-tree 208.

At block 700, the optimized kd-tree application 106 receives the query point for which a nearest neighbor is to be identified. A top-down searching procedure is performed from the root to the leaf nodes. At each internal node, the optimized kd-tree process inspects which side of the partition hyperplane the query point lies, then the associated child node is accordingly accessed. This descent down process requires $\log_2 n$ (a height of the optimized kd-tree) comparisons to reach the leaf node.

At block 702, the optimized kd-tree application 106 conducts a priority search. The priority search is based on a priority queue, in which the nodes or the cells associated with the nodes are searched in the order of their distances from the query point. The priority queue is a type of data used for computing a certain class of data structures defined by operations. In this instance, priority queue supports three operations, such as adding an element to the queue with an associated priority, removing the element from the queue that has a highest priority and returning it, and looking at the element with a highest priority without removing it.

At block 704, the optimized kd-tree process determines whether or not there are more cells closer in distance to query point. If there are more cells closer in distance to the query point, (a "Yes" branch from block 704), the process then proceeds to block 706.

At block 706, the optimized kd-tree process continues searching for more cells that may be closer in distance to the query point. The process continues iteratively back to block 706, until there are no more cells to be searched.

If at block 704, it is determined that there are no more cells closer to the query point (the "No" branch from block 704), then the process proceeds to block 708.

At block 708, the optimized kd-tree process terminates the search. The search is terminated when there are no more cells within the distance defined by the closest point found so far.

In another implementation, an approximate nearest neighbor (ANN) search may be performed for some high-dimensional applications. An advanced search termination scheme may be performed. For instance, the ANN search is performed after searching a specified number of nodes, or if the distance from the closet cell to the query exceeds a δ. The δ may be calculated using the equation below:

$$\delta = \frac{d(x_p, x_q)}{(1+\varepsilon)}, \text{ where } x_q.$$

In the equation above, $x_q$ represents the query point, $x_p$ represents the NN found so far, and ε represents a positive termination. For example, the value of ε may determine that no subsequent point to be found may be closer to q than to δ. Thus, the ANN has a probability to obtain the true nearest neighbor.

The optimized kd-tree may be offered as an application or as a search tool to users through a service provider. In one implementation, the optimized kd-tree may have its own website where users may upload their data and view their constructed optimized kd-tree prior to conducting an NN or ANN search.

Illustrative Computing Device and Optimized kd-Tree Application

Figure 8:
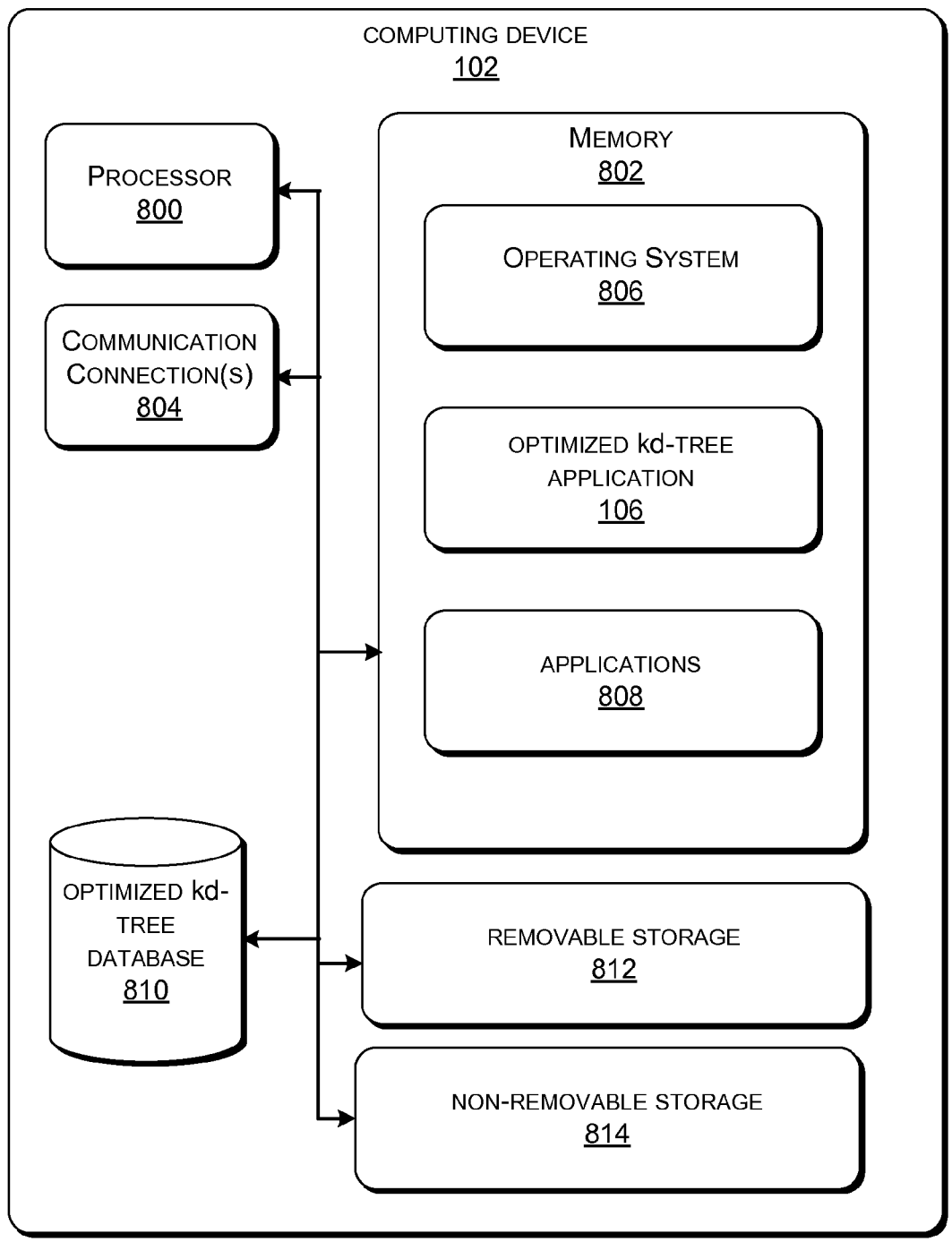
FIG. 8 is a block diagram showing an illustrative computing device with select components usable with the architecture of FIG. 1.

FIG. 8 is a block diagram showing the illustrative computing device 102 usable with the environment of FIG. 1 and the high level functions of FIG. 2. The computing device 102 may be configured as any suitable system capable of performing a variety of functions, which includes, but is not limited to, implementing the optimized kd-tree application 106. In one illustrative configuration, the computing device 102 comprises at least one processor 800, a memory 802, and one or more communication connection(s) 804. The one or more communication connection(s) 804 enable the computing device 102 to communicate over a network. The network may include a wide area network (WAN), a local area network (e.g., WiFi), a personal area network (e.g., Bluetooth), and/or any other suitable communication modules to allow the computing device 102 to communicate over the network(s).

Turning to the contents of the memory 802 in more detail, the memory 802 may store an operating system 806, the optimized kd-tree application 106, and one or more applications 808. The operating system 806 and the optimized kd-tree application 106 are executed on the processor 800 to construct the optimized kd-tree.

In the illustrated example, the optimized kd-tree application 106 represents any application or a combination of applications that enables the computing device 102 to receive many types of input information, including input of the data points, input of a user specified query, input of a query point, and any other types of information. The optimized kd-tree application 106 also calculates the variances, determines the candidate partition axes, selects the partition axes based on the calculated variances, and creates the optimized kd-tree to be used for large-scale applications.

The one or more applications 808 represents any application that enables other types of applications and/or services that may be used with the optimized tree application 106. For example, the one or more applications 808 may enable accessing the internet, receiving input data through web pages, accessing a database, and the like. An example may include, a browser application through which web-based data may be accessed.

The computing device 102 may include an optimized kd-tree database 810 to store a collection of the data points 108 that are input, to store the data points organized in the optimized kd-tree 110, to store the multiple randomized optimized kd-trees, and the like.

The computing device 102 may also include additional removable storage 812 and/or non-removable storage 814. Any memory described herein may include volatile memory (such as RAM), nonvolatile memory, removable memory, and/or non-removable memory, implemented in any method or technology for storage of information, such as computer-readable storage media, computer-readable instructions, data structures, applications, program modules, components, emails, and/or other content. Also, the processor 800 described herein may include onboard memory in addition to or instead of the memory 802 shown in the figure. The memory may include computer storage media such as, but not limited to, random access memory (RAM), read only memory (ROM), flash memory, compact disc (CD) ROM, digital versatile disk (DVD), optical storage, magnetic disk storage or other magnetic storage devices, or any other medium which can be used to store the desired information and which can be accessed by the respective systems and computing devices.

In contrast, communication media may embody computer readable instructions, data structures, program modules, or other data in a modulated data signal, such as a carrier wave, or other transmission mechanism.

The computing device 102, as described above, may be implemented in various types of systems or networks. For example, the computing device 102 may be a part of, including but not limited to, a client-server system, a peer-to-peer computer network, a distributed network, an enterprise architecture, a local area network, a wide area network, a virtual private network, a storage area network, and the like.

Various instructions, methods, techniques, applications, and modules described herein may be implemented as computer-executable instructions that are executable by one or more computers, servers, or telecommunication devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable storage media.

Figure 9:
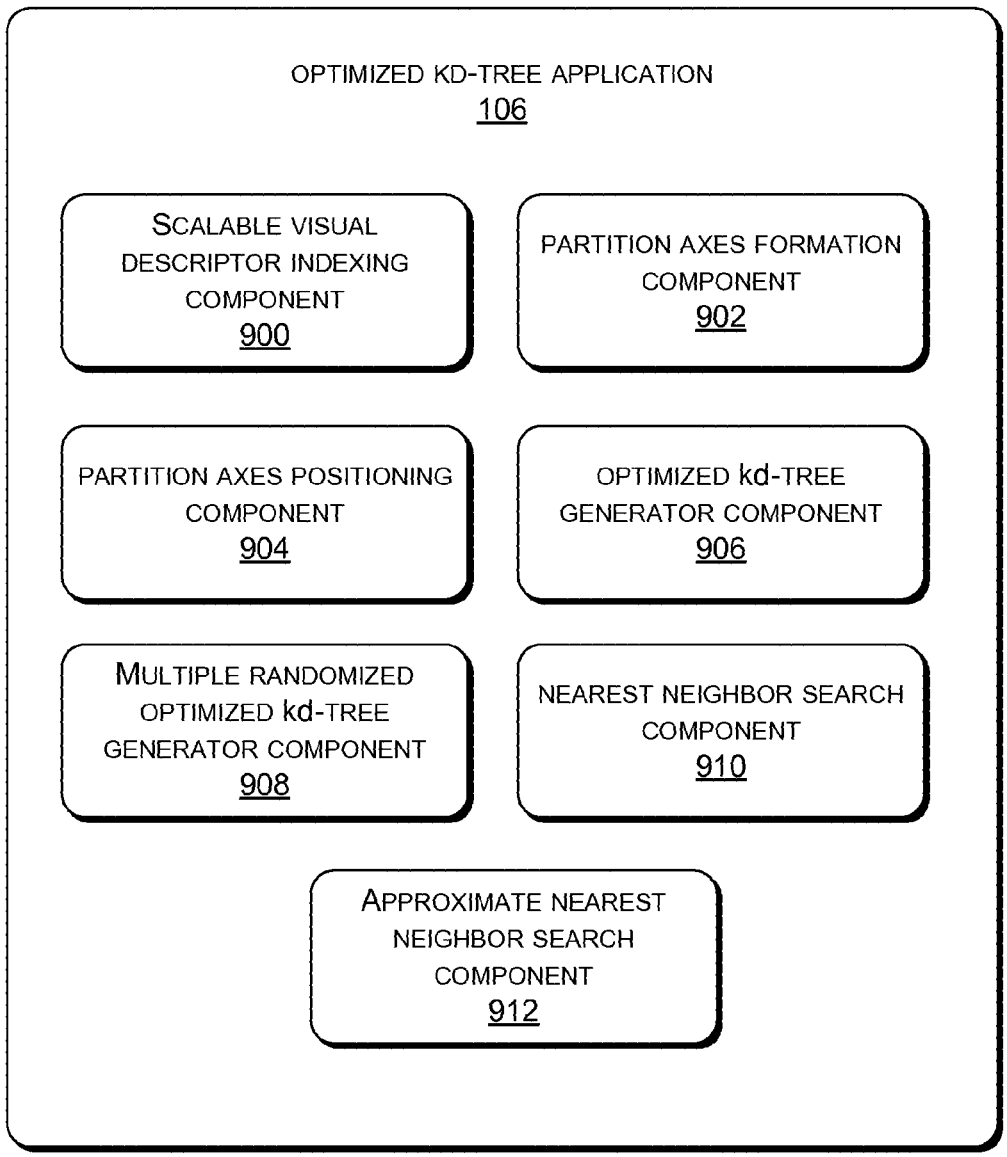
FIG. 9 is a block diagram showing an illustrative optimized kd-tree application with select components usable with the architecture of FIG. 1 and the computing device of FIG. 8.

FIG. 9 illustrates select components of the illustrative optimized kd-tree application 106. FIG. 9 is a block diagram showing the illustrative optimized kd-tree application 106 usable with the environment of FIG. 1 and the high level functions of FIG. 2. The operations and functions for constructing the optimized kd-tree are described above as being performed by the optimized kd-tree application 106. In an implementation, the optimized kd-tree application 106 is shown having separate components that may be used to implement the construction of the optimized kd-tree. There is no limitation to the components that may be used to construct the optimized kd-tree.

The illustrative optimized kd-tree application 106 includes a scalable visual descriptor indexing component 900, a partition axes formation component 902, a partition axes positioning component 904, an optimized kd-tree generator component 906, a multiple randomized optimized kd-tree generator component 908, a nearest neighbor search component 910, and an approximate nearest neighbor search component 912.

The scalable visual descriptor indexing component 900 provides descriptions of the visual features of the contents in images to help with indexing the data. An advantage of the scalable visual descriptor indexing component 900 is being able to handle large-scale applications. The scalable visual descriptor indexing component 900 describes characteristics that include but are not limited to, shape, color, texture, region, motion, and others. For example, shape may pertain to contours and shapes for 2D and 3D images. In some instances, color may represent a color distribution and/or a color relation between sequences or group of images. In some instances, texture may characterize image textures or regions. In another instance, motion may describe motion in a video sequence.

The partition axes formation component 902 determines the partition hyperplanes to divide the space for each internal node. The partition axes formation component 902 identifies the top d axes ranked by variance as dominant axes. As a consequence, only the covariance matrix is computed for these d dimensions. The partition axes formation component 902 further evaluates the partition axes by evaluating single coordinate axes, two-coordinate axis combinations to d-coordinate-axis combinations. The partition axes formation component 902 further selects the partition axis having a large variance from the binary combinations of coordinate axes as the formed partition axis. This formed partition axis may be combined with other dominant axes that are not yet contained in the optimized kd-tree.

The partition axes positioning component 904 determines the orientation or position of the partition hyperplanes from the root-to-leaf path. In particular, the orientation of the partition axes should be orthogonal or parallel with those of its ancestors. The position helps calculate a distance from a query point to a cell in the optimized kd-tree.

The optimized kd-tree generator component 906 creates the space-partitioning data structure that organizes the data points 108. In particular, the optimized kd-tree generator component 906 constructs the optimized kd-tree to index the data points 108 so the nearest neighbors of a query vector can be quickly found.

The multiple randomized optimized kd-tree generator component 908 extends a single optimized kd-tree to multiple randomized optimized kd-trees that are index-based. This improves the search performance without increasing the query time. The optimized kd-tree application 106 may perform the searching simultaneously in the multiple randomized kd-trees through a shared priority queue.

The nearest neighbor search component 910 identifies the closest point to a query point in the optimized kd-tree. This is accomplished by searching through the nodes of the optimized kd-tree to find the closest point to the query point. The nearest neighborhood search component 910 accesses fewer nodes than in the conventional kd-tree, accesses the nodes in a certain order, and access the nodes effectively and efficiently than in the conventional kd-tree.

The approximate nearest neighbor search component 912 identifies points that are approximately closest to a query point in the optimized kd-tree for some high-dimensional applications. The approximate nearest neighbor search component 912 performs an advanced search termination scheme as described above with reference to FIG. 7. The approximate nearest neighbor search component 912 searches a specified number of nodes. Alternatively, the approximate nearest neighbor search component 912 calculates whether the distance from the closet cell to the query exceeds the δ as described above with reference to FIG. 7. The approximate nearest neighbor search component 912 visits fewer nodes than in the conventional kd-tree in the high-dimensional applications.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more computer-readable storage media encoded with computer instructions that, when executed on a processor, direct the processor to perform operations comprising:
   constructing a data structure, the data structure comprising:
      a first part forming a partition axis for at least one node, the partition axis based at least in part on a binary combination of top coordinate axes for the at least one node ranked by variances; and
      a second part identifying the partition axis for the at least one node relative to a partition axis of an ancestor node.

2. The one or more computer-readable storage media of claim 1, wherein the forming the partition axis comprises computing a covariance matrix for top dominant coordinate axes and selecting the binary combination of the top dominant coordinate axes having a large calculated variance as the formed partition axis.

3. The one or more computer-readable storage media of claim 1, wherein the identifying the partition axis of the at least one node comprises determining the binary combination of top coordinate axes being perpendicular to or parallel with the partition axis of the ancestor node.

4. The one or more computer-readable storage media of claim 1, wherein the identifying the partition axis comprises performing a candidate combination enumeration by:
   identifying an ancestor node and a subset of dominant axes used by the ancestor node in a dominant axes list;
   generating combinations of the subset of dominant axes that are orthogonal or parallel to the ancestor node; and
   rearranging the dominant axes list by adding lower ranked axes to the dominant axes list.

5. The one or more computer-readable storage media of claim 1, further comprising indexing a large number of scale-invariant feature transform (SIFT) features or other visual features in the constructed data structure for large-scale applications.

6. The one or more computer-readable storage media of claim 1, further comprising matching image descriptors for an image retrieval and recognition in the constructed data structure.

7. The one or more computer-readable storage media of claim 1, further comprising:
   building the constructed data structure as part of an optimized k-dimensional (kd)-tree; and
   extending the constructed data structure in the optimized kd-tree to multiple randomized optimized kd-trees.

8. The one or more computer-readable storage media of claim 1, further comprising:
   receiving a query point; and
   conducting a nearest neighbor search in the constructed data structure based at least in part on the query point.

9. A method implemented at least partially by a processor, the method comprising:
   receiving input of a set of data points associated with nodes;
   dividing the set of the data points into subsets for the nodes by generating coordinate axes;
   identifying a partition axis for at least one node generated from the coordinate axes combined in a binary way, in which the act of identifying the partition axis includes identifying top dominant coordinate axes from the coordinate axes based at least in part on ranked variances; and
   outputting an optimized kd-tree based at least in part on the identified partition axis.

10. The method of claim 9 wherein the receiving input of the set of the data points comprises downloading images from a collection of data from a webpage.

11. The method of claim 9, wherein the receiving input of the set of the data points comprises extracting visual features or scale-invariant feature transform (SIFT)) for images and indexing the extracted visual features in the optimized kd-tree for large-scale applications.

12. The method of claim 9, wherein the identifying the partition axis comprises:
   computing a covariance matrix for the top dominant coordinate axes based at least in part on binary combinations; and
   keeping the top dominant coordinate axes having large calculated variances as candidates for the identified partition axis.

13. The method of claim 9, wherein the identifying the partition axis of at least one node comprises determining a binary combination of top coordinate axes being orthogonal or parallel with the partition axis of the ancestor node.

14. The method of claim 9, further comprising receiving a query point and conducting an approximate nearest neighbor search in the optimized kd-tree to find a point closest to the query point.

15. The method of claim 9, further comprising providing the optimized kd-tree as a searching service that is accessible through a website.

16. A system comprising:
   a processor;
   a scalable visual descriptor indexing component executed by the processor to index visual features including scale-invariant feature transform (SIFT) features extracted from input image data;
   a partition axes formation component executed by the processor to identify partition axes by calculating a covariance matrix for top dominant coordinate axes based at least in part on binary combinations of coordinate axes; and an optimized kd-tree generator component to create an optimized kd-tree based at least in part on the binary combinations as candidate partition axes.

17. The system of claim 16, wherein the identified partition axes are selected based at least in part on having a large calculated variance based at least in part on the binary combinations of the coordinate axes.

18. The system of claim 16, further comprising a partition axis positioning component to identify a binary combination of a top coordinate axis being orthogonal or parallel with the partition axis of an ancestor node.

19. The system of claim 16, further comprising a nearest neighbor search component to receive a query point and to conduct a nearest neighbor search in the optimized kd-tree to find a point closest to the query point.

20. The system of claim 16, wherein the optimized kd-tree is provided as a searching service accessible through a website.

* * * * *